United States Patent
Cocchi et al.

(10) Patent No.: US 9,961,919 B2
(45) Date of Patent: May 8, 2018

(54) MACHINE FOR MAKING VARIEGATED ICE CREAM OR ICE CREAM SHAKE

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 17 days.

(21) Appl. No.: 14/922,888

(22) Filed: Oct. 26, 2015

(65) Prior Publication Data
US 2016/0128353 A1 May 12, 2016

(30) Foreign Application Priority Data
Nov. 6, 2014 (IT) .............................. BO2014A0622

(51) Int. Cl.
*A23G 9/22* (2006.01)
*A23G 9/08* (2006.01)
*A23G 9/28* (2006.01)

(52) U.S. Cl.
CPC ................. *A23G 9/22* (2013.01); *A23G 9/08* (2013.01); *A23G 9/228* (2013.01); *A23G 9/28* (2013.01); *A23G 9/282* (2013.01)

(58) Field of Classification Search
CPC ...................................................... A23G 9/22
See application file for complete search history.

(56) References Cited

U.S. PATENT DOCUMENTS

| 2,816,518 | A | | 12/1957 | Daggett | |
| 3,052,381 | A | * | 9/1962 | Carpigiani | A23G 9/281 222/132 |
| 3,477,393 | A | | 11/1969 | Bell et al. | |
| 4,504,511 | A | * | 3/1985 | Binley | A21C 3/08 264/209.2 |
| 4,637,221 | A | * | 1/1987 | Levine | A23G 9/28 366/286 |

(Continued)

FOREIGN PATENT DOCUMENTS

| EP | 1139779 A1 | 10/2001 |
| EP | 1927290 A1 | 6/2008 |

OTHER PUBLICATIONS

Italian Search Report dated Feb. 27, 2015 for related Italian Application No. IT BO20140622.

*Primary Examiner* — David Angwin
*Assistant Examiner* — Spencer h Kirkwood
(74) *Attorney, Agent, or Firm* — Shuttleworth & Ingersoll, PLC; Timothy J. Klima

(57) ABSTRACT

A machine for making variegated ice cream or ice cream shake, including: a basic structure; one or more basic product mixing and freezing units, where each mixing and freezing unit in turn includes a processing cylinder containing the basic product and cooled by a respective refrigerating system and a stirring member mounted inside the processing cylinder and rotating to mix the basic product to prevent it from hardening and sticking to the cooled inside wall of the processing cylinder and to transform the basic product into a basic flavor; a closing element for closing the cylinder and provided with at least one outlet duct leading to the processing cylinder at one end and to an outlet mouth at the other end.

12 Claims, 4 Drawing Sheets

(56) References Cited

U.S. PATENT DOCUMENTS

| | | | | |
|---|---|---|---|---|
| 6,735,967 B1* | 5/2004 | Bischel | ............. | A23G 9/08 |
| | | | | 62/196.4 |
| 7,017,784 B2* | 3/2006 | Ross | ............. | A23G 9/22 |
| | | | | 222/367 |
| 7,047,758 B2* | 5/2006 | Ross | ............. | A23G 9/12 |
| | | | | 366/285 |
| 2006/0090654 A1* | 5/2006 | Mange | ............. | A23G 3/0063 |
| | | | | 99/494 |
| 2007/0194045 A1* | 8/2007 | Py | ............. | B65B 39/004 |
| | | | | 222/105 |
| 2007/0295750 A1 | 12/2007 | Cocchi et al. | | |
| 2008/0073376 A1* | 3/2008 | Gist | ............. | A23G 9/045 |
| | | | | 222/145.5 |
| 2012/0312049 A1* | 12/2012 | Downs, III | ............. | A23G 9/20 |
| | | | | 62/340 |

* cited by examiner

MACHINE FOR MAKING VARIEGATED ICE CREAM OR ICE CREAM SHAKE

This application claims priority to Italian Patent Application BO2014A000622 filed Nov. 6, 2014, the entirety of which is incorporated by reference herein.

BACKGROUND OF THE INVENTION

This invention relates to a machine for making food products, and more specifically, ice cream products and ice cream shake products—shakes for short—with the added feature that the end product is variegated.

The term "variegated ice-cream" (hereinafter, for simplicity of description, the term "variegated" is used with reference only to ice cream but without thereby excluding reference to shakes) denotes a finished product which comprises a base ice cream product (for example, custard, vanilla, chocolate, etc.) to which one or more flavors, in the form of syrup (for example, cherry, coffee and others) are added for the twofold purpose of adding contrasting color to, and varying the taste of, the base ice cream product.

SUMMARY OF THE INVENTION

Apparatuses used to make this type of ice cream comprise:
a basic structure;
one or more units for mixing and freezing a product constituting the base flavor and in turn comprising a processing cylinder containing the product (or a basic mixture suitable for making the product) and cooled by a respective refrigerating system adapted to keep the temperature inside the cylinder within a range of predetermined temperatures (usually from −15° C. to 0° C.);
an element mounted inside the cylinder and operating in rotation (in the form of an endless screw or different in form) which stirs the product, preventing it from hardening and sticking to the cooled inside wall of the cylinder;
an element for closing the cylinder, mounted at the front wall of the basic structure and provided with at least one outlet duct for feeding out the product;
a shutoff device for closing/opening the at least one outlet duct so that, in the open position, the product can flow out of the cylinder to a container to form a takeaway serving of ice cream or shake;
one or more syrup containers, which are also mounted inside the basic structure and which may or may not be subject to respective cooling units for controlling their hold temperatures, each container being provided with an outfeed pipe for feeding the syrup to the outside in proximity to or at the aforementioned product outlet duct;
a mixing chamber which is located in the outlet duct and inside which the different products are, when required, mixed so that the product dispensed to the outside is what is known as variegated ice cream, that is, ice cream made up of two (or more) different food products.

In prior art machines, variegation occurs in practice by mixing the different products in the mixing chamber, with the result that the variegated ice cream produced is a more or less single-colored portion resulting from the set of products fed out of the mixer, without any clear distinction between the colors (and hence flavors) of the finished ice cream served to the consumer.

Mixing inside the chamber is accomplished by means of a "whisk" or simply a whisk-like or rotary vane tool which pushes the food product, generally speaking, towards the outlet mouth through which it is dispensed to the outside.

The main disadvantage of these prior art solutions is that the end product leaving the machine is basically not variegated. In other words, there is no clear distinction between the different basic flavors and the added syrups, without the striations which ought to distinguish a truly variegated product.

In particular, frequent complaints about prior art machines regard problems caused by bad or incorrect distribution of the syrup flavors (colored) relative to the basic flavor, creating an end product which is unappealing to the eye and of overall poor quality.

Indeed, it should be stressed that to obtain a high-quality end product, the flavor provided by the syrups must remain mainly on the surface, forming overlapping streaks distinct from the basic product.

The aim of this invention is to provide a machine for making variegated ice cream and ice cream shake products which overcomes the above mentioned drawbacks of the prior art and with which it is possible to make and serve from the respective dispenser a food product in which the variegation is clear and well defined.

Another aim of the invention is to provide a machine of the aforementioned type by which it is possible to make a variegated product where the quantity of the products which are mixed, or rather, stratified, to obtain the variegation is variable according to the requirements of the end user.

These aims are fully achieved by the machine according to the present disclosure.

BRIEF DESCRIPTION OF THE DRAWINGS

These and other features of the invention will become more apparent from the following detailed description of a preferred, non-limiting embodiment of it, with reference to the accompanying drawings, in which.

DESCRIPTION OF THE PREFERRED EMBODIMENTS

With reference to the accompanying drawings, the machine 100 of this invention is designed to make food products of the types known as ice cream and ice cream shake, or shake for short, with the added feature that the end product is variegated, as clearly specified in the preamble of this description.

Figure 1:
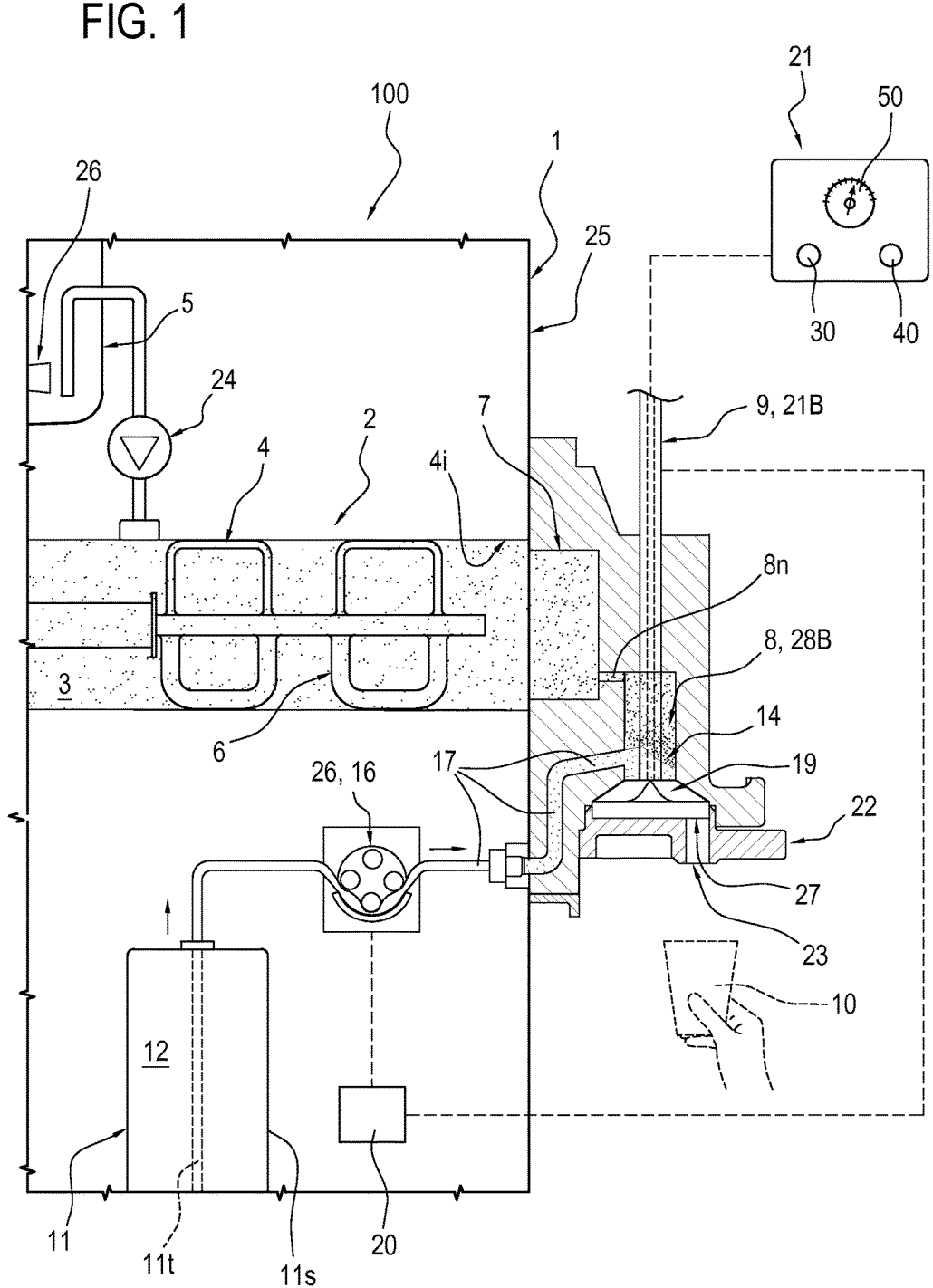
FIG. 1 shows the machine of the invention in a partial cross section, with some parts cut away in order to better illustrate others and with some parts shown schematically.

More in detail—see FIG. 1—the machine comprises a basic structure 1 (preferably in the form of a prismatic body) inside which the following are mounted:
one or more units 2 for mixing and freezing a product 3 constituting the basic flavor and in turn comprising a processing cylinder 4 containing the product 3 (or a basic mixture suitable for making the product) and cooled by a respective refrigerating system adapted to keep the temperature inside the cylinder 4 within a range of predetermined temperatures;
a stirring member 6 mounted inside the cylinder and operating in rotation (in the form of an endless screw or different in form) which stirs the product 3, preventing it from hardening and sticking to the cooled inside wall 4i of the cylinder 4;

a closing element 7 for closing the cylinder 4, mounted at the front wall of the basic structure 1 and provided with at least one outlet duct 8 for feeding out the product 3;

a shutoff device 9 for closing/opening the at least one outlet duct 8 so that, in the open position, the product 3 can flow out of the cylinder through the outlet duct 8 to a container 10 to form a takeaway serving of ice cream or shake;

one or more containers 11, also mounted inside the basic structure 1, for containing the food syrups 12 and which may or may not be subject to respective cooling units (not illustrated in the drawings) for controlling their hold temperatures; each container 11 being provided with an outfeed pipe 17 and feed means for feeding the respective syrup towards the outside in proximity to or at the outlet duct 8 for feeding out the product;

a mixing chamber 14 which is located along the outlet duct 8 and inside which the different products are, when required, mixed so that the product dispensed to the outside is what is known as variegated ice cream, that is, ice cream made up of two (or more) different food products.

The term "outlet duct" 8 is used to denote in their entirety the stretches of duct through which the product flows and running from the outlet mouth 8n of the mixing and freezing unit 2, passing through the closing element 7 and ending at the outlet mouth proper, labelled 27.

As regards the container (or containers) 11 of syrup product, FIG. 1 illustrates a first embodiment in which the container 11 is simply a tank 11s where there is a suction pipe 11t through which the syrup 12 is made to flow by means of a pump 16 (preferably a peristaltic pump) which (if activated) delivers the syrup along the feed duct 17 to the mixing chamber 14.

The reference numeral 20 denotes a control unit and the reference numeral 21 denotes a selection or control interface usable by an operator and configured to allow regulating product outflow and the speed of rotation of a mixing member 19.

It should be noted that the selection or control interface 21 may be of the touch-screen type or it may have one or more manual controls.

The mixing member 19, as shown in FIG. 1, consists of a "whisk" (simply a whisk-like or vane tool), that is, a rotary element which mixes the food product in the mixing chamber 14.

It should be noted the mixing member 19 is preferably movable longitudinally along a predetermined direction (vertical) between a closed position, where it closes the duct 8, and an open position, where it opens the duct 8.

More precisely, in the embodiment illustrated, the mixing member 19 acts as an element for closing/opening the duct 8, that is to say, as a shutter.

More precisely, the top walls of the mixing chamber 14 are shaped to be sealedly coupled to the mixing member 19.

It should be noted that the mixing member 19 is also provided with radial vanes.

Preferably, the mixing member 19 has a frustoconical shape.

The mixing member 19 is mounted at the mixing chamber 14. More specifically, it operates on the product at the mixing chamber 14 itself.

It should be noted that the mixing member 19 acts on the product in the mixing chamber 14 when in the lowered position, that is to say, the mixing member is set in rotation only when it is in the lowered position.

The mixing member 19 is connected to a rod and/or to one or more drive elements. An actuator (not illustrated) operates on the rod and/or drive elements to set the mixing member 19 in rotation.

The actuator preferably comprises a motor.

It should be also noted that the rod or drive elements protrude outside the closing element 7 so as to allow moving the mixing member 19 between the lowered and raised positions.

Figure 2:
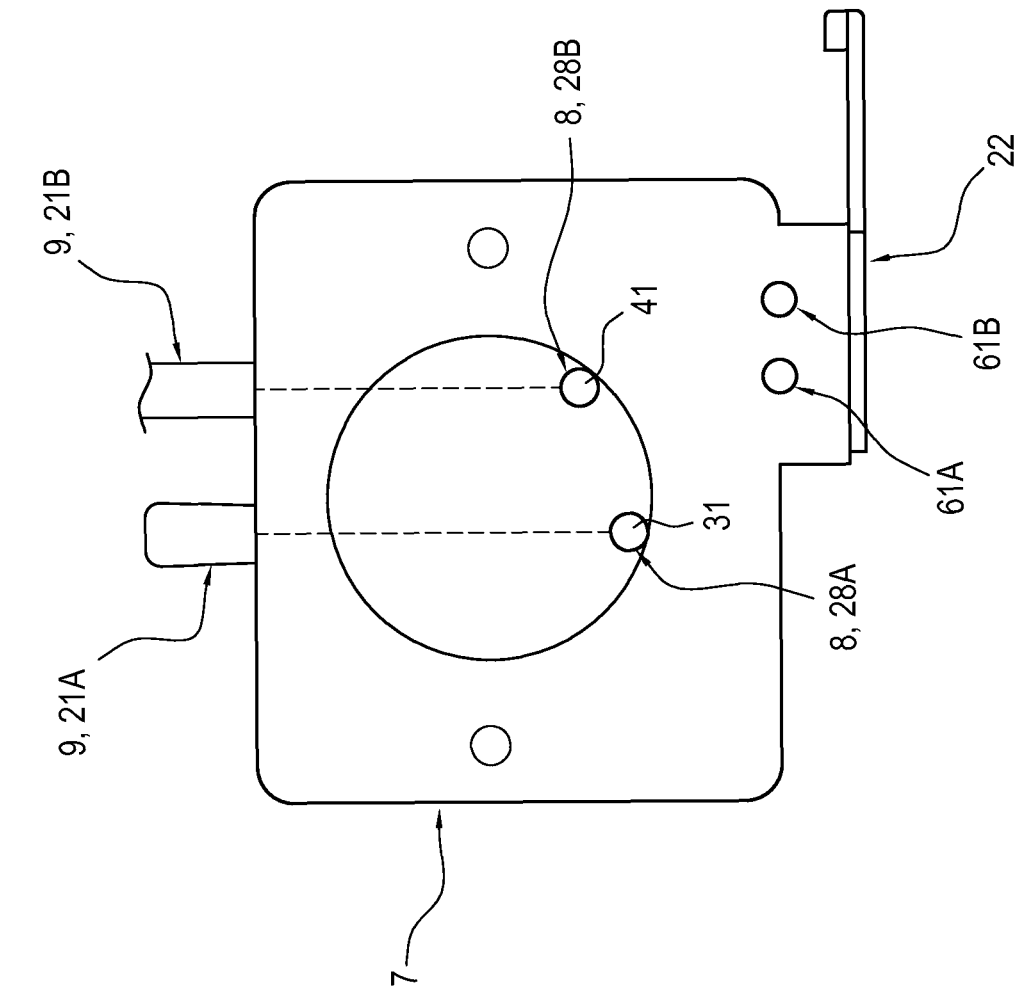
FIG. 2 is a detail view of the machine of the invention, showing the element for closing the mixing and freezing cylinder.

With reference to the embodiment illustrated in FIG. 2, it should be observed that the closing element 7 has a first outlet duct 28A to deliver to the outside the ice cream product defined by the basic flavor, and a second outlet duct 28B, in which the mixing chamber 14 is located, to deliver the variegated product to the outside.

It should be noted, therefore, that the closing element 7 has two distinct and separate ducts in it: the first duct 28A is used to dispense basic flavor ice cream product, while the second duct is used to dispense shake or variegated product.

The machine is therefore able to dispense different types of products: ice cream through the first duct 28A and shake or variegated product through the second duct 28B.

Also in the embodiment illustrated in FIG. 2, the shutoff device 9 comprises a first shutter 21A, positioned to close/open the first outlet duct 28A and a second shutter 21B, positioned to close/open the second outlet duct 28B, the first and second shutters (21A,21B) being independent of each other.

It should be noted, in particular, that with reference to the second outlet duct 28B, the machine 100 further comprises a shutter plate 22 located under the second outlet duct 28B and provided with an outlet hole 23, the shutter plate 22 being movable between an open position where the respective outlet hole 23 is in communication with the second outlet duct 28B to allow delivering the variegated product to the outside, and a closed position where the outlet hole 23 of the shutter plate 22 does not face the second outlet duct 28B and delivery of the variegated product through the second outlet duct 28B is prevented.

The control unit 20 and the selection interface 21 are configured to allow the following operations to be carried out if the operator intends releasing variegated product into the container below, that is to say, if the operator intends making a variegated product.

If the operator (following a request from the end consumer) selects a pushbutton 30, for example, opening of the second duct 28B (see FIG. 2) is enabled and the basic flavor is thus fed from the mixing and freezing unit 4 to the mixing chamber 14.

At the same time, the pump 16 is also activated and feeds the syrup 12 through further holes 61A, 61B (see FIG. 2 again) to the mixing chamber 14.

At this point, the mixer 19 is also activated in order to mix the basic flavor with the syrups 12 inside the mixing chamber 14.

According to another aspect, the machine may also comprise a control 50 (touch screen or physical pushbutton) at the operator's disposal for adjusting the speed of rotation of the mixing member 19: this allows adjusting the speed of rotation of the mixing member 19 to modulate the merging of the two different products (at different, constant speeds but also at variable speeds during mixing) thus obtaining a distinct variegation of the end ice cream product in which the two products (syrup and basic flavor) remain clearly distinct and separate and hence aesthetically and organoleptically able to define a "variegated ice cream" in the true sense.

It should be noted, therefore, that the control unit 20 is, more generally speaking, configured to adjust the speed of rotation when the operator chooses to dispense a variegated product (reducing the speed of rotation compared to when the product to be dispensed is a non-variegated shake product): this allows obtaining an end ice cream product in which the two products (syrup and basic flavor) remain clearly distinct and separate and are thus aesthetically and organoleptically able to define a "variegated ice cream" in the true sense.

Thus, the control unit 20 directly controls the motor which drives the mixer 19.

Preferably, this motor is controlled by an inverter.

Described below are two aspects relating to the feeding of the syrups 12 to the mixing chamber 14.

Figure 3:
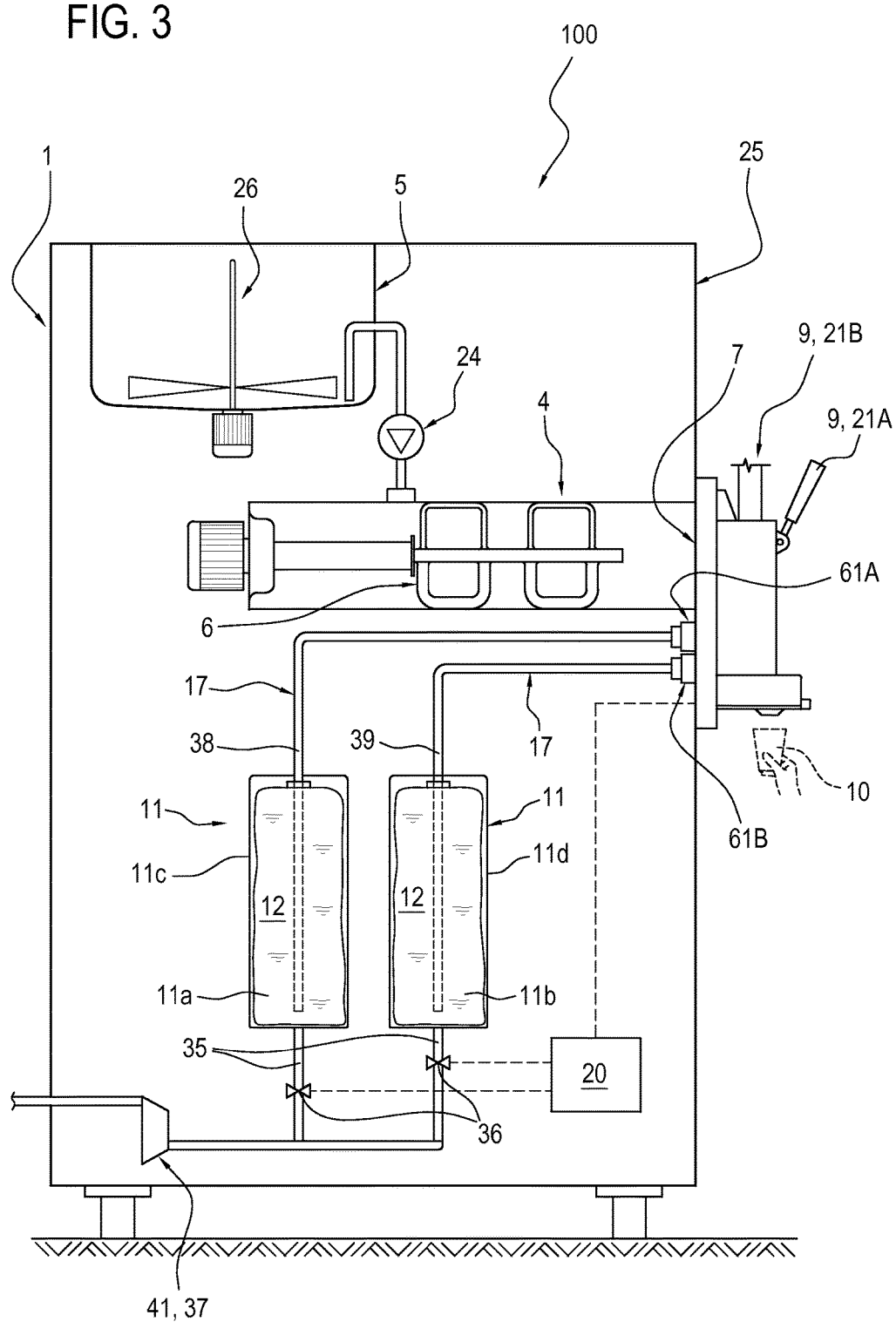
FIGS. 3 and 4 illustrate different embodiments of the syrup feed units in the machine of the invention.

FIG. 3 illustrates an alternative embodiment of the machine of the invention, in which the syrup containers 11 (in this case, 2 containers are shown) are deformable bags (soft) 11a, 11b, which are placed inside respective rigid containers 11c, 11d placed under pressure through respective ducts 35 provided by ON/OFF valves 36 mounted downstream of a compressed air system.

Preferably, the machine 100 comprises a compressor 37 for supplying compressed air to the rigid containers 11c, 11d.

In this case, the operator can select—for example using a pushbutton 40—one or the other (or both) of the syrup containers whose delivery 38, 39 flows into the holes 61A, 61B.

In this case, the supply of syrup product 12 is obtained from the respective container 11 using compressed air to squeeze the deformable container (11a; 11b) or soft bag from the outside.

Containers 11 of the type illustrated in FIG. 3 are known by the technical term of "bag in box" (or its acronym "BIB").

Figure 4:
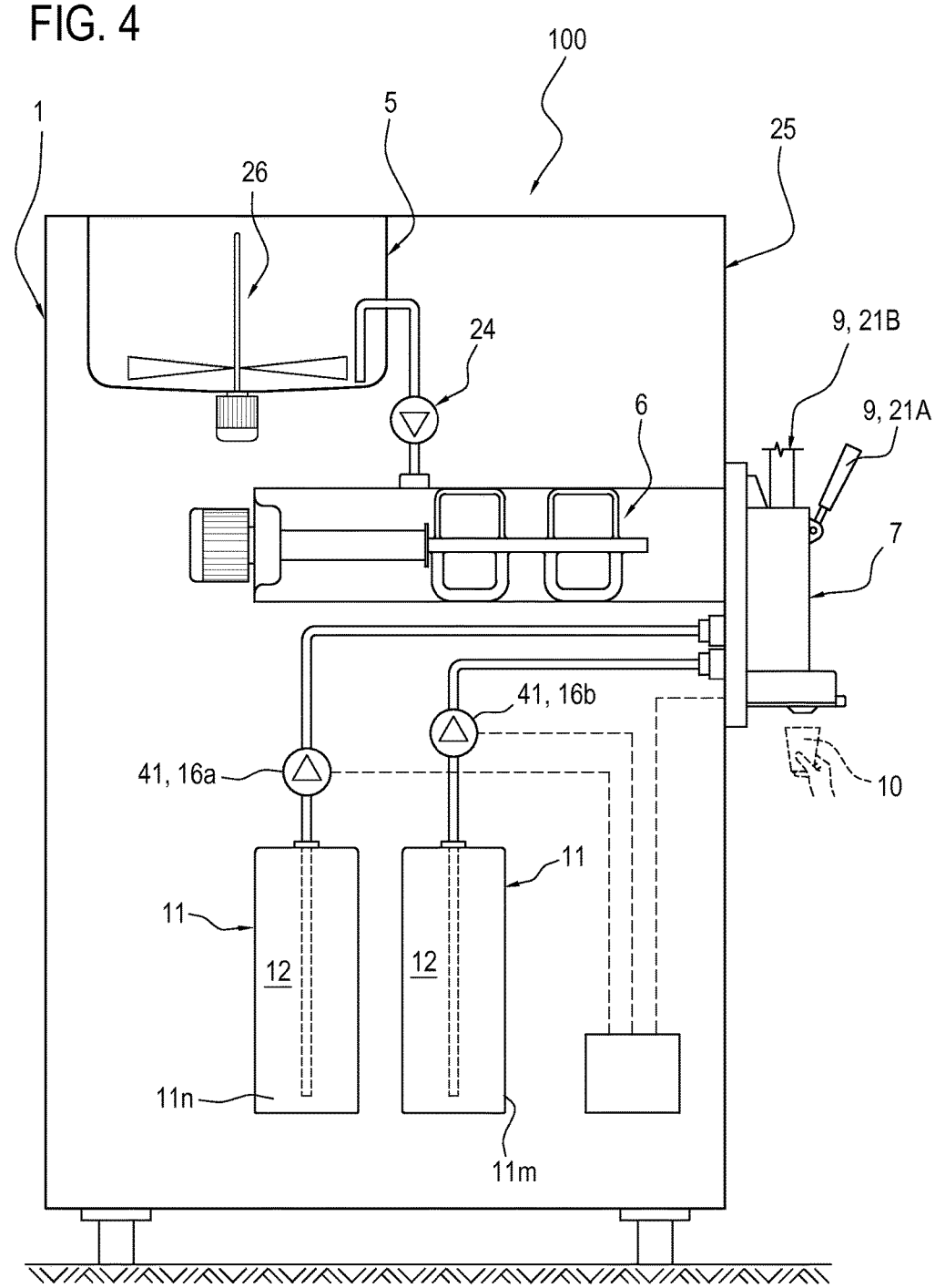

FIG. 4, on the other hand, illustrates the structure of FIG. 1 showing two containers (11n, 11m) for supplying two distinct syrup products 12 in the manner described above.

In this case, the containers are labelled 11n and 11m, respectively, and the pumps, 16a and 16b.

It should be also noted, therefore, as illustrated in FIG. 4, that the means for feeding the syrup to the mixing chamber comprise a plurality of pumps (16a, 16b).

According to another aspect, the machine 100 comprises at least one cooling unit (not illustrated) for controlling the temperature of the containment tanks and keeping the internal temperature within a preset range (refrigeration).

As mentioned previously, the control unit 20 is preferably configured to allow reversing the speed of rotation of the mixing member 19.

According to this aspect, the control unit 20 is configured to allow reversing the power phases of the motor so as to allow reversing the speed of rotation of the mixer 19.

Preferably, the feed pipe 17 has an internal diameter which is greater than 2.5 mm.

According to this aspect, the machine 100 preferably allows supplying both "thin" syrup and "thick" syrup of the type used as topping.

According to another aspect, the machine 100 comprises a further receptacle 5, connected to the processing cylinder 4 to supply the basic products to the processing cylinder 2.

Preferably, the machine 100 is equipped with heat treatment means configured to heat or cool the walls of the further receptacle 5.

The further receptacle is used substantially to pasteurize the basic mixture, which is then transferred into the processing cylinder 4.

The heat treatment means preferably comprise a heat exchanger associated with the further receptacle 5.

It should be noted that the machine 100 is preferably equipped with a pump 24 for transferring the basic product from the further receptacle 5 to the processing cylinder 4.

As illustrated, the further receptacle 5 is provided with a stirring member 26 (schematically represented in FIGS. 3 and 4).

What is claimed is:

1. A machine for making variegated ice cream, the variegated ice cream including ice cream shake products, comprising:
   a basic structure;
   one or more basic product mixing and freezing units, where each mixing and freezing unit in turn comprises a processing cylinder for containing a basic product and cooled by a respective refrigerating system and a stirring member mounted inside the processing cylinder and rotatable to mix the basic product to prevent it from hardening and sticking to a cooled inside wall of the processing cylinder and to transform the basic product into a basic flavor ice cream product;
   a closing element for closing the processing cylinder, located at a front wall of the basic structure and including at least one outlet duct leading to the processing cylinder at one end and to an outlet mouth at another end;
   a shutoff device for opening and closing the at least one outlet duct so that, in an open position, the basic flavor ice cream product can flow out of the processing cylinder to supply the outlet mouth through which the basic flavor ice cream product is fed to an exterior of the machine into a container to form a takeaway serving of ice cream or shake;
   one or more containment tanks, also mounted inside the basic structure, for containing respective food syrups, each containment tank including an outfeed pipe and a feed device for feeding the respective food syrup to the at least one outlet duct;
   a mixing chamber, which is located along the at least one outlet duct upstream of the outlet mouth, and inside of which the basic flavor ice cream product and at least one of the food syrups is mixed by a respective mixing member mounted inside the mixing chamber and driven in rotation by an actuator to make the variegated ice cream defined by a sum of at least two components between the basic flavor ice cream product and the at least one of the food syrups, wherein the mixing member includes radial vanes and is shaped to engage a wall of the mixing chamber to seal against the mixing chamber, the mixing member being movable longitudinally along a predetermined direction between a closed position, where the mixing member engages the mixing chamber to seal against the mixing chamber and close the at least one outlet duct, and an open position, where the mixing member opens the at least one outlet duct;
   a control unit connected to the actuator of the mixing member and configured to drive the actuator to vary a rotation speed of the mixing member;

a selection or control interface including an operator control usable by an operator and configured to allow regulating the rotation speed of the mixing member and a quantity of flow into the mixing chamber of at least one chosen from the basic flavor ice cream product and the at least one of the food syrups;

wherein the closing element includes a first outlet duct to deliver to the exterior of the machine the basic flavor ice cream product, and a second outlet duct, in which the mixing chamber is located, to deliver the variegated ice cream to the exterior of the machine, the ducts being distinct and separate from each other;

a shutter plate located under the second outlet duct and including an outlet hole, the shutter plate being movable between an open position where the outlet hole is in communication with the second outlet duct to allow delivering the variegated product to the exterior of the machine, and a closed position where the outlet hole is not in communication with the second outlet duct to prevent delivery of the variegated product through the second outlet duct.

2. The machine according to claim 1, comprising at least one cooling unit for controlling a temperature of the containment tanks.

3. The machine according to claim 1, wherein the shutoff device comprises a first shutter, positioned to open and close the first outlet duct and a second shutter, positioned to open and close the second outlet duct, the first and second shutters being independent of each other.

4. The machine according to claim 3, wherein the first shutter includes a handgrip configured to be moved by the operator between an open position where the first shutter opens the first outlet duct and a second, closed position where the first shutter closes the first outlet duct.

5. The machine according to claim 1, wherein the actuator comprises an inverter and a motor connected to the mixing member to drive the mixing member in rotation, the inverter being connected to the motor to drive the motor and being also connected to the control unit to receive commands relating to a rotation speed of the motor.

6. The machine according to claim 1, wherein the actuator is configured to allow inverting the rotation speed of the mixing member.

7. The machine according to claim 6, wherein the actuator comprises an inverter and a motor, the inverter being connected to the motor to drive the motor and being also connected to the control unit to receive commands relating to a rotation speed of the motor, the control unit being configured to invert the power supply phases of the motor to invert the rotation speed of the mixing member.

8. The machine according to claim 1, wherein the outfeed pipe has an internal diameter which is greater than 2.5 mm.

9. The machine according to claim 1, wherein the machine comprises a further receptacle, connected to the processing cylinder to supply the basic product to the processing cylinder.

10. The machine according to claim 9, wherein the further receptacle is equipped with a respective stirrer, and wherein the machine comprises a heat treatment system configured to perform at least one chosen from heating and cooling the further receptacle.

11. The machine according to claim 1, wherein the feed device includes a pump.

12. The machine according to claim 1, at least one of the containment tanks includes a rigid outer container which can be hermetically closed and a deformable inner container containing one of the food syrups, and wherein the outfeed pipe is connected to the deformable inner container and the feed device includes a compressor connected to the rigid outer container to supply pressurized air into the rigid outer container to compress the walls of the deformable inner container.

* * * * *